United States Patent [19]
Albino

[11] Patent Number: 5,799,989
[45] Date of Patent: Sep. 1, 1998

[54] CORRUGATED TUBING FITTING

[75] Inventor: Mark Albino, Belchertown, Mass.

[73] Assignee: Omega-Flex, Inc., Westfield, Mass.

[21] Appl. No.: 693,475

[22] Filed: Aug. 8, 1996

[51] Int. Cl.$^6$ .................................. F16L 37/18
[52] U.S. Cl. .................. 285/334.5; 285/903; 285/249
[58] Field of Search .................. 285/334.5, 903, 285/149, 246, 249

[56] References Cited

U.S. PATENT DOCUMENTS

| | | |
|---|---|---|
| 96,914 | 11/1869 | Hill . |
| 163,588 | 5/1875 | Goodall . |
| 178,313 | 6/1876 | Leland . |
| 262,581 | 8/1882 | Doolittle . |
| 546,314 | 9/1895 | Farrey . |
| 2,112,238 | 3/1938 | Guarnaschelli ............ 285/149 |
| 2,357,669 | 9/1944 | Lake .................... 285/149 |
| 2,363,586 | 11/1944 | Guarnaschelli ............ 285/149 |
| 2,424,727 | 7/1947 | Wenk . |
| 2,430,657 | 11/1947 | Zolleis . |
| 2,496,149 | 1/1950 | Cahenzli, Jr. . |
| 2,848,254 | 8/1958 | Millar ................... 285/149 |
| 2,858,147 | 10/1958 | Guarnaschelli ............ 285/149 |
| 2,946,607 | 7/1960 | Bauer ................. 285/334.5 |
| 2,991,093 | 7/1961 | Guarnaschelli ............ 285/149 |
| 3,008,736 | 11/1961 | Samiran ................. 285/149 |
| 3,112,937 | 12/1963 | Williams ................. 285/149 |
| 3,294,426 | 12/1966 | Lyon . |
| 3,306,637 | 2/1967 | Press et al. ............. 285/149 |
| 3,381,980 | 5/1968 | Smith . |
| 4,423,891 | 1/1984 | Menges .................. 285/903 |
| 4,669,761 | 6/1987 | Huling . |
| 4,674,775 | 6/1987 | Tajima et al. ............ 285/903 |
| 4,867,489 | 9/1989 | Patel . |
| 4,893,657 | 1/1990 | Usui ................... 285/334.5 |
| 4,904,002 | 2/1990 | Sasa et al. .............. 285/903 |
| 4,907,830 | 3/1990 | Sasa et al. .............. 285/903 |
| 4,909,547 | 3/1990 | Guy .................... 285/903 |
| 5,131,145 | 7/1992 | Badoureaux . |
| 5,413,147 | 5/1995 | Moreiras et al. . |
| 5,423,578 | 6/1995 | Kanomata et al. ......... 285/903 |
| 5,489,127 | 2/1996 | Anglin et al. .......... 285/334.5 |

OTHER PUBLICATIONS

Titeflex "Assembly of CSST Mechanical Fittings" (Date Unknown).

*Primary Examiner*—Eric K. Nicholson
*Attorney, Agent, or Firm*—Fishman, Dionne, Cantor & Colburn

[57] ABSTRACT

A fitting for use with corrugated stainless steel tubing. The fitting includes a body having a locating sleeve. The locating sleeve aligns the central axis of the body with the central axis of the tubing. A nut, retained on the tubing by split ring washers, is tightened on a threaded end of the body. As the nut is tightened, a taper formed on the body flares the tubing. The flared tubing is compressed between the taper on the body and a beveled section of the split ring washer. This forms a leak proof fitting without the need for separate flaring tools.

8 Claims, 8 Drawing Sheets

CORRUGATED TUBING FITTING

BACKGROUND OF THE INVENTION

1. Field of the Invention

The invention relates generally to a fitting for corrugated pipe and in particular to a pipe fitting including a locating sleeve that eases installation of the fitting.

2. Prior Art

The flexible gas piping (FGP) system, also referred to as corrugated stainless steel tubing (CSST) and formerly Interior Gas Piping (IGP) was developed in Japan and first introduced into that market by Osoka Gas and Tokyo Gas Companies during the early 1980's. The system utilizes stainless steel corrugated tubing supplied in rolls or coils with field attachable fittings to distribute gas from a central supply point such as the meter or regulator to the various appliances within a house or building. The technology, which has likened the process of plumbing a house for gas to wiring a house for electricity, substantially reduces installation time and hence the associated higher cost of labor. The technology was brought to the United States by the Gas Research Institute who saw it as a means of making gas installations more competitive; thereby increasing the percentage of new construction plumbed for gas and increasing the overall consumption of natural gas on a national basis. The technology was enthusiastically endorsed and supported by major gas utilities who had seen the significant higher cost of installed piping as their single greatest obstacle to selling more gas. Code acceptance required more time and effort to obtain, but the product is now recognized by all national mode codes by ANSI, the National Fire Protection Association/National Fuel Gas Code and is tested and recognized by the American Gas Association. This product will eventually supplant black-iron pipe which accounts for approximately 80% of all fuel gas piping today, as well as copper tube which, while enjoying many of the same advantages of FGP, is being banned from this application at an increasing rate.

There have been three types of fittings originally put into the field. The first fitting introduced into the field used a fiber gasket to make the seal and no special tools were needed to assemble this fitting. But this fitting has a higher incidence of leaks than the flared metal to metal seals used by other manufacturers.

The second fitting introduced into the field used first a specialized tool to flatten the convolutions at the end of the CSST tube where the fitting was to be attached and then a second tool was used to put a single flare on the tube end. This product is now off the market due to failures in the tubing caused by work hardening of the stainless steel in the flattening and flaring process.

The third type of fitting was introduced into the field using no special tools to make a metal to metal seal by folding the convolutions of the tube back on itself creating a double flare. After a limited time in the field it was realized that this fitting design was inconsistent in making a leak tight seal. The remedy to the problem was to design an insert type flaring tool this was used for about three years. A second redesign was conducted, upgrading the insert tool to a socket type flaring tool, and was completed about one and one half years ago.

SUMMARY OF THE INVENTION

The above-discussed and other drawbacks and deficiencies of the prior art are overcome or alleviated by the fitting of the present invention. The fitting includes a body for engaging the tubing. The body has a conduit for providing access to the tubing. A locating sleeve is connected to the body and extends away from the body for aligning the body with the tubing. A nut positioned around the tubing engages threads formed on the body for connecting the body to the tubing. The fitting is installed by cutting the tubing in a valley in the surface of the tubing and placing a nut over the tubing. Two split ring washers are placed in a valley adjacent to the cut end of the tubing to restrict movement of the nut. The body is aligned with the tubing by placing a locating sleeve connected to the body in the tubing. The nut engages threads on the body and as the nut is tightened, a tapered end of the body engages the cut end of the tubing and flares the cut end of the tubing. The fitting will make a metal to metal seal by folding the convolutions of the tubing back against itself creating a double flare reliably without the need for flaring or flattening tools.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
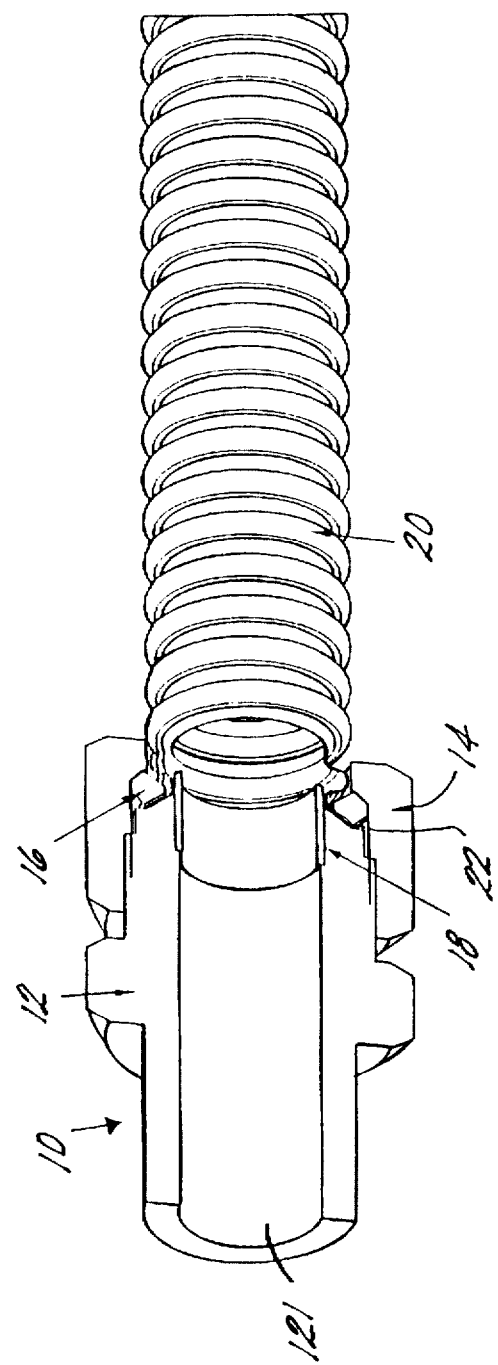
FIG. 1 is a perspective, partial cut away view of the fitting connected to corrugated stainless steel tubing.

FIG. 1 is a perspective, partial cut-away view of the fitting, shown generally at 10, connected to corrugated stainless steel tubing 20 (CSST). The fitting 10 is made up of a body 12 including a locating sleeve 18. The body 12 is threaded and engages a nut 14 that is retained on the tubing 20 through split ring washers 16. The split ring washers 16 are positioned in a valley on the outer surface of the tubing 20. The body 12 includes a central conduit 121 that provides access to the interior of the tubing. The individual components of the fitting 10 are described in detail below.

The process for mounting the fitting 10 to the tubing 20 will now be described. The tubing 20 is first cut with a pipe cutter in a valley in the surface of the tubing 20. The nut 14 is placed over the tubing and the two split ring washers 16 are placed in the first valley adjacent to the cut end. The locating sleeve 18, which is connected to the body 12, is placed in the tubing 20. The locating sleeve 18 ensures that the central axis of the body 12 is aligned with the central axis of the tubing 20. The nut 14 is then tightened on a first threaded end of the body 12. As the nut is tightened, the tubing at the outside of the split ring washers 16 (e.g. near the cut end of the tubing 20) is folded upon itself and flared outwards by a tapered portion 122 (shown in FIG. 3A) of the body 12 to form flared tubing 22. The flared tubing 22 is compressed between the tapered portion 122 and a beveled section 162 (shown in FIG. 3A) on the split ring washer 16 and a leak proof fitting is achieved. Because the body 12 is aligned with the tubing 20 through the locating sleeve 18, there is no need to use a flaring tool that was previously used in the prior art. This eliminates a step in the conventional installation process and reduces the number of tools the installer must carry.

Figure 2:
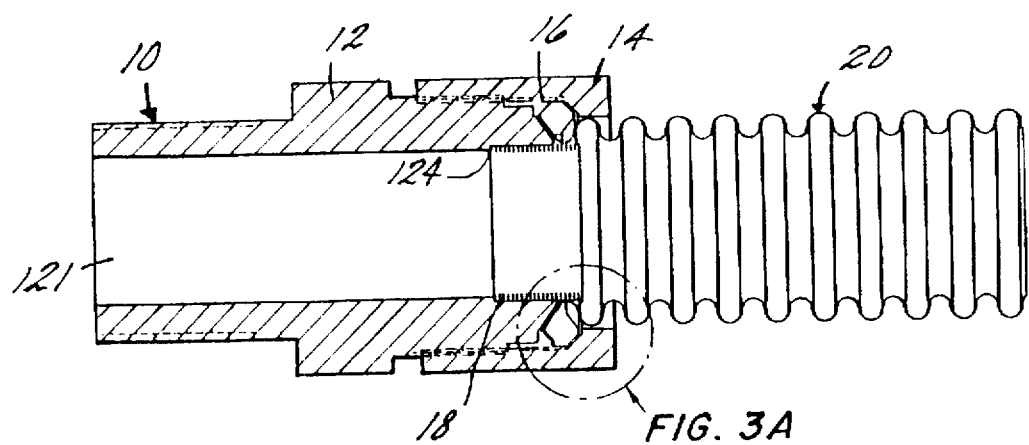
FIG. 2 is a cross-sectional side view of the fitting connected to corrugated stainless steel tubing.

FIG. 2 is a side, partial cross-sectional view of the fitting 10 attached to the tubing 20. The body 12 includes a shoulder 124 for preventing the locating sleeve 18 from traveling too far into the body 12. The shoulder 124 is formed by increasing the diameter of the conduit 121 in the body 12 near the first threaded end of the body 12. The locating sleeve 18 has an outer diameter that is approximately equal to the inner diameter of the body 12 at the opening near the first threaded end. The locating sleeve 18 is press fit into the body 12. In an exemplary embodiment, the locating sleeve 18 is made from stainless steel and the body 12 is made from brass. Alternatively, the locating sleeve 18 may be made from the same material as the body 12 and formed along with the body 12 instead of being a separate component as shown in FIG. 3B.

Figure 3A:
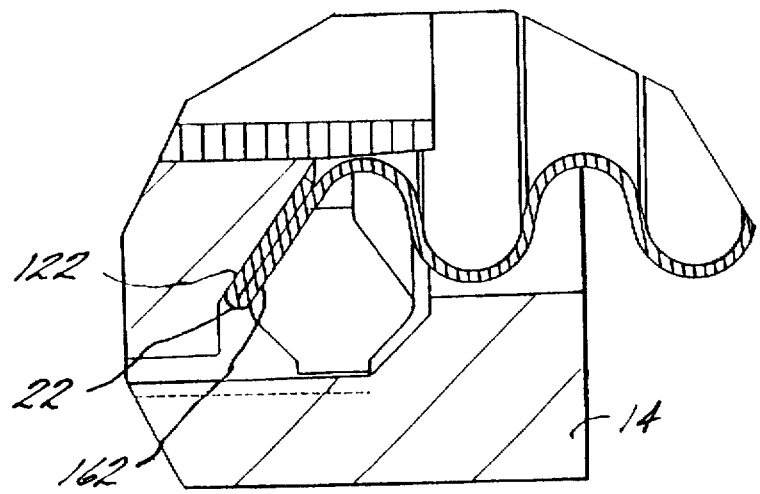
FIG. 3A is an enlarged view of a portion of FIG. 2.
Figure 3B:
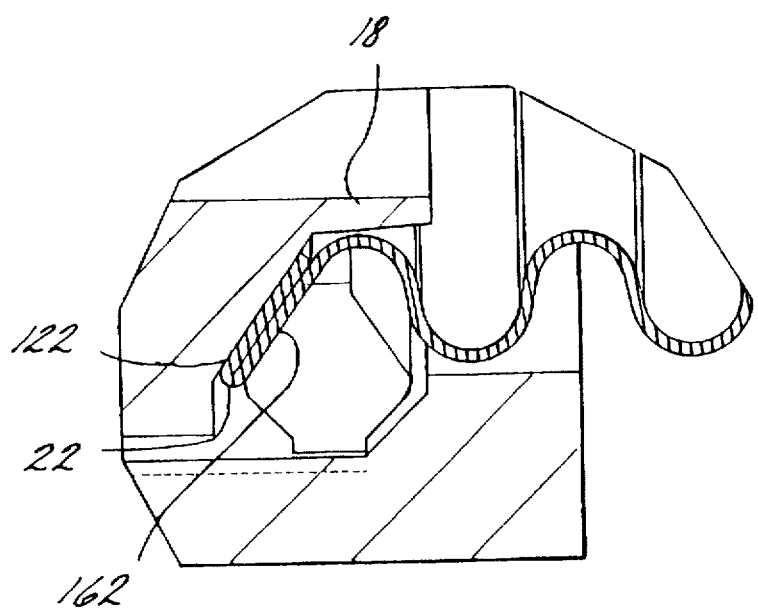
FIG. 3B is an enlarged view of a portion of a fitting having an alternative locating sleeve.

FIG. 3A is an enlarged view of a portion of FIG. 2. As previously discussed, the taper 122 formed on the body 12 folds the tubing 20 onto itself and flares the tubing to create the flared tubing 22. The flared tubing 22 is compressed between the taper 122 and the bevel 162 on the split ring washer 16 as the nut 14 is tightened. As mentioned above, FIG. 3B shows an alternative embodiment where the locating sleeve 18 is formed along with the body 12.

Figure 4:
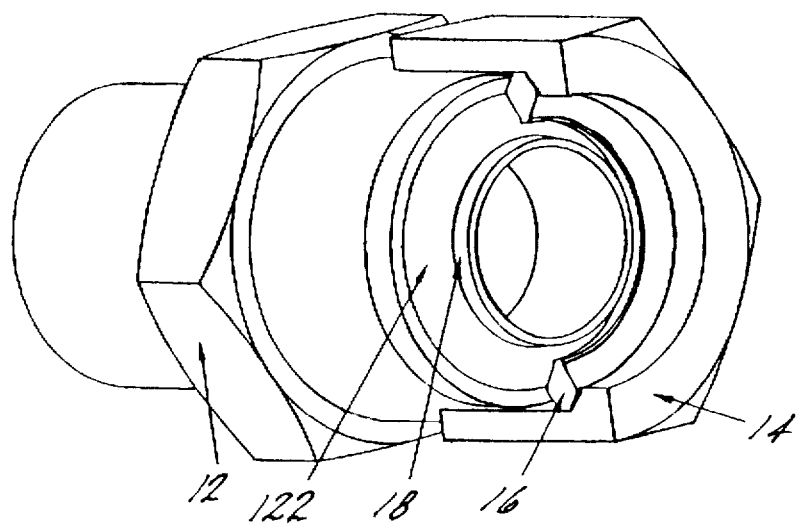
FIG. 4 is a perspective view of the fitting.
Figure 5:
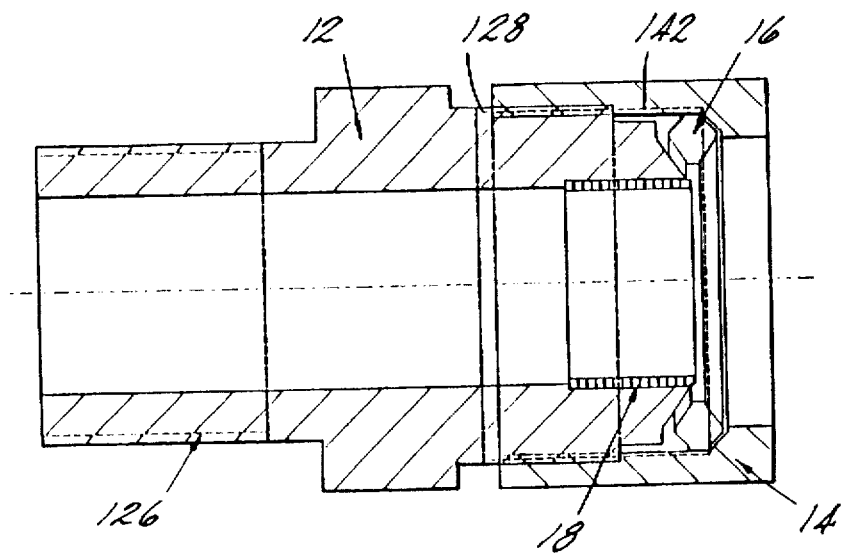
FIG. 5 is a cross-sectional side view of the fitting.

FIG. 4 is a perspective, partial cut-away view of the fitting 10 without the tubing 20. The split ring washer 16 includes angled and flat surfaces, described below with reference to FIGS. 6–9, that correspond to surfaces formed on the body 12 and the nut 14. FIG. 5 is a cross-sectional view of the fitting 10, without the tubing 20. The dashed lines in FIG. 5 represent the threads formed on the body 12 and the nut 14. The nut 14 includes interior threads 142 that engage a first set of exterior threads 128 formed on the fitting body 12. A second set of exterior threads 126 are formed on the body 12 for connecting the fitting 10 to additional components in the gas distribution system.

Figure 6:
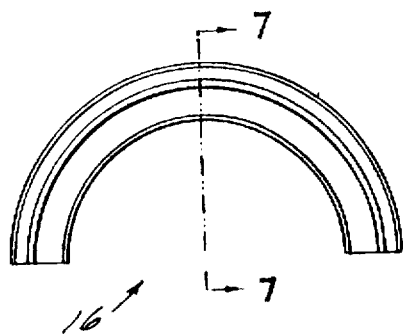
FIG. 6 is a front view of a split ring washer.
Figure 7:
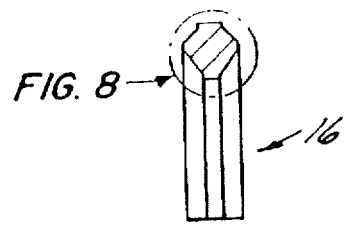
FIG. 7 is a cross-sectional view taken along line 7—7 of FIG. 6.
Figure 8:
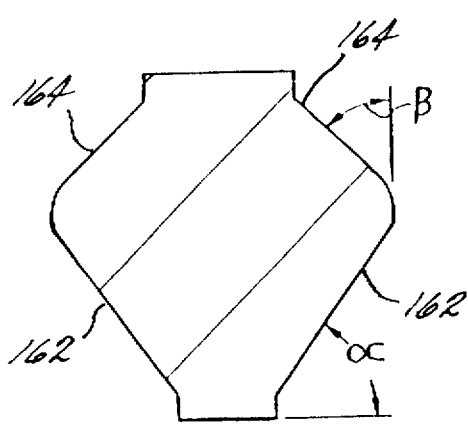
FIG. 8 is an enlarged view of a portion of FIG. 7.
Figure 9:
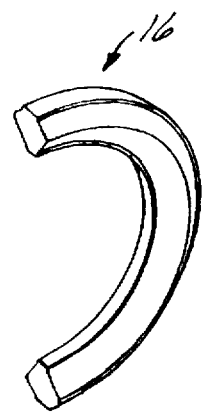
FIG. 9 is a perspective view of the split ring washer.

FIG. 6 is a front view of one of the split ring washers 16. FIG. 7 is a cross-sectional view taken along line 7—7 of FIG. 6. As shown in FIG. 8, which is an enlarged view of a portion of FIG. 7, the split ring washer 16 includes two interior beveled surfaces 162 and two exterior beveled surfaces 164. The interior beveled surfaces 162 form an angle α relative to the surface of the interior of the split ring washer 16. The angle α corresponds to the angle of the taper 122 of body 12 (shown in FIG. 10). In an exemplary embodiment α equals 55°. The exterior beveled surfaces 164 form an angle β relative to the normal to the surface of the interior of the split ring washer 16. The angle β corresponds to a beveled nut shoulder 144 formed in the nut 14 (shown in FIG. 15). In an exemplary embodiment, the angle β is 45°. FIG. 9 is a perspective view of the split ring washer 16.

Figure 10:
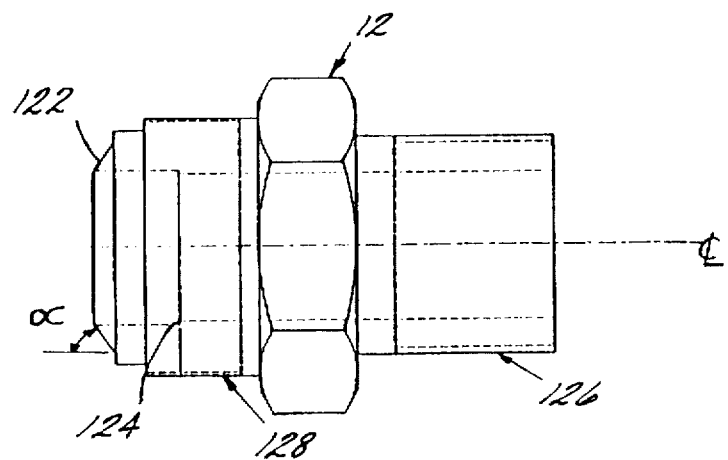
FIG. 10 is a side view of the fitting body.
Figure 11:
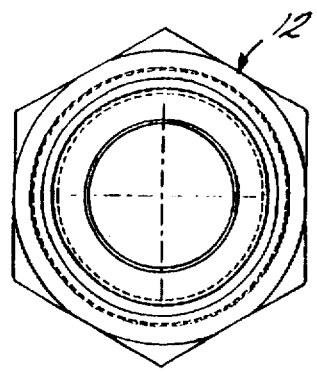
FIG. 11 is an end view of the fitting body.
Figure 12:
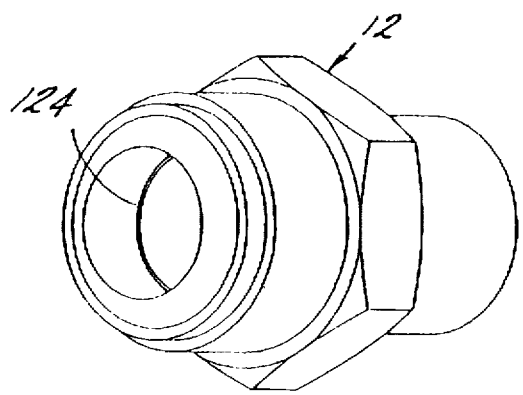
FIG. 12 is a perspective view of the fitting body.

FIG. 10 is a side view of the body 12 without the locating sleeve 18. As previously described, the body 12 includes a first set of exterior threads 128 for engaging threads 142 formed in the nut 14. A second set of exterior threads 126 provide for coupling the fitting 10 to the gas distribution system. The taper 122 at one end of the body 12 has an angle α with respect to the longitudinal axis of the body 12. The angle of the taper 122 corresponds to the angle of the interior beveled surface 162 shown in FIG. 8. The shoulder 124 engages the locating sleeve 18, if a press fit locating sleeve is used, and prevents the locating sleeve 18 from traveling too far into the body 12. FIGS. 11 and 12 are end and perspective views of the body 12, respectively, and are self-explanatory.

Figure 13:
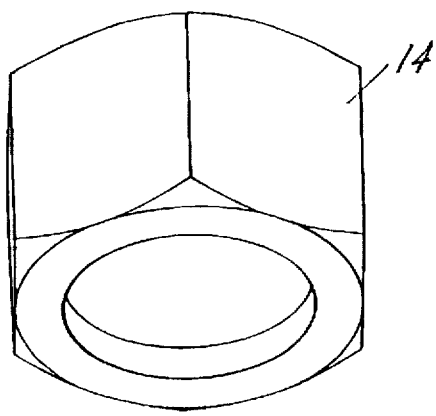
FIG. 13 is a perspective view of the fitting nut.
Figure 14:
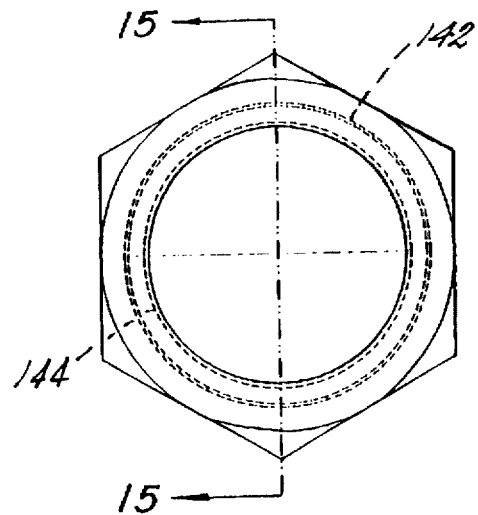
FIG. 14 is an end view of the fitting nut.
Figure 16:
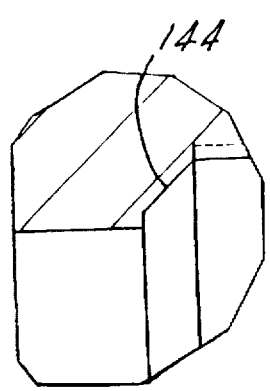
FIG. 16 is an enlarged view of a portion of FIG. 15.
Figure 15:
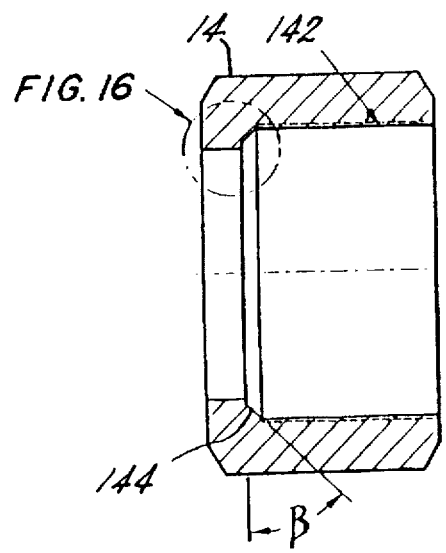
FIG. 15 is a cross-sectional view taken along line 15—15 of FIG. 14.

FIG. 13 is a perspective view of the nut 14. FIG. 14 is an end view of the nut 14. The nut 14 includes interior threads 142 for mating with the first set of exterior threads 128 formed on the body 12 (shown in FIG. 10). FIG. 15 is a cross-sectional view of the nut 14 taken along line 15—15 of FIG. 14. The nut includes a beveled shoulder 144 having an angle β with respect to the bottom surface of the nut 14. The angle β of the beveled shoulder 144 corresponds to the angle of exterior beveled surface 164 formed in the split ring washer 16 (shown in FIG. 8). FIG. 16 is an enlarged view of a portion of the nut 14 shown in FIG. 15.

Figure 17:
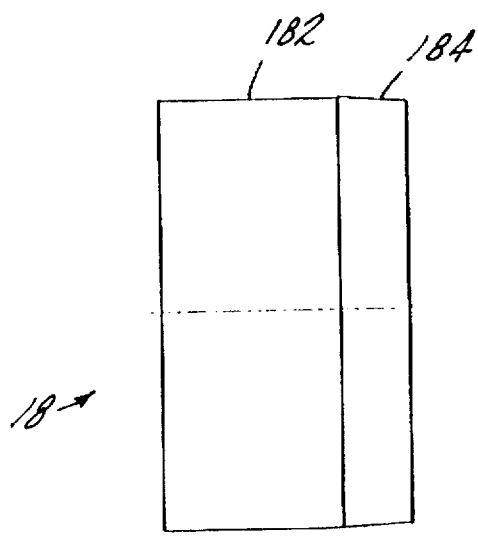
FIG. 17 is a side view of the locating sleeve.
Figure 18:
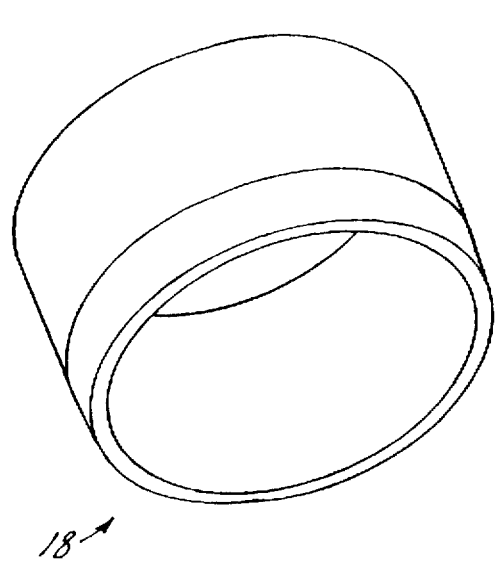
FIG. 18 is a perspective view of the locating sleeve.
Figure 19:
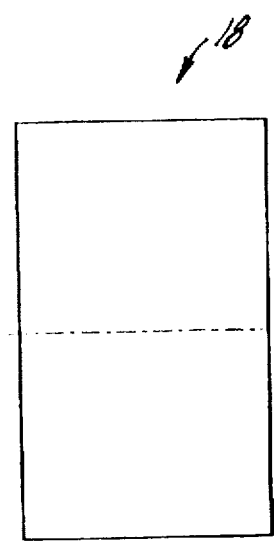
FIG. 19 is a side view of an alternative locating sleeve.

FIG. 17 is a side view of the locating sleeve 18. The locating sleeve 18 includes a cylindrical section 182 and a tapered section 184. The tapered section has a decreasing outer diameter away from the cylindrical section 182. The inner diameter of the locating sleeve 18 is preferably constant through both the cylindrical section 182 and the tapered section 184 as shown in FIG. 3A. The tapered section 184 eases placement of the locating sleeve 18 in the tubing 20 as shown in FIG. 1. FIG. 18 is a perspective view of the locating sleeve 18 shown in FIG. 17. The locating sleeve 18 does not need to have the tapered section 184. As shown in FIG. 19, the locating sleeve 18 may be a cylindrical member without any reduction in outside diameter. This eliminates the tapered section 184 shown in FIG. 17.

As described above, the locating sleeve ensures that the central axis of the body is aligned with the central axis of the tubing. When the nut is tightened, the tubing on the outside of the split ring washer is flared by a taper formed in the body. The flared tubing is compressed between the body taper and an interior beveled surface on the split ring washer. This creates a tight, leak proof fitting while eliminating the need for separate flaring tools. The time for completing the installation is simplified and the number of tools needed is reduced.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fitting coupled to a corrugated tubing comprising:

corrugated tubing;

a body for engaging the said corrugated tubing, said body including a conduit for providing access to said corrugated tubing and a tapered end;

a locating sleeve connected to said body and extending away from said body into said tubing for aligning said body with said corrugated tubing;

a nut positioned around said corrugated tubing for connecting said body to said corrugated tubing;

a split ring washer said split ring washer including a bevel having an angle substantially equal to an angle of said tapered end of said body positioned in a valley of said corrugated tubing; and a double flare of said corrugated tubing positioned between said tapered end of said body and said split ring washer.

2. The fitting and tubing as claimed in claim 1 wherein an end of said corrugated tubing is located in a valley.

3. The fitting of claim 1 wherein said locating sleeve is press fit into said conduit.

4. The fitting of claim 3 wherein said body includes a shoulder formed in said conduit for positioning said locating sleeve in said conduit.

5. The fitting of claim 1 wherein said locating sleeve comprises a cylindrical section and a tapered section, said tapered section extending away from said body.

6. The fitting of claim 5 wherein said tapered section and said cylindrical section have equal inner diameters and said tapered section has an outer diameter that decreases away from said cylindrical section.

7. The fitting of claim 1 wherein said locating sleeve is cylindrical.

8. A method of connecting a fitting to corrugated metal tubing, the method comprising:

cutting the tubing in a valley;

placing a nut over the tubing;

placing two split ring washers in a valley adjacent to the cut end of the tubing;

aligning a threaded fitting body having a tapered end with the tubing; and tightening said nut on said threaded fitting body thereby causing said tapered end to engage the cut end of the tubing to create a double flare of tubing between said tapered end and said split ring washers said split ring washers each including a bevel having an angle substantially equal to an angle of said tapered end of said body;

wherein aligning comprises placing a locating sleeve that is connected to said body in the tubing.

* * * * *

UNITED STATES PATENT AND TRADEMARK OFFICE
CERTIFICATE OF CORRECTION

PATENT NO.    : 5,799,989
DATED         : Sep. 1, 1998
INVENTOR(S) : Mark Albino It is certified that error appears in the above-identified patent and that said Letters Patent is hereby corrected as shown below:

Column 1 line 60 delete "this" insert --which--

Column 5 line 13 insert --positioned in a valley of said corrugated tubing-- between "washer" and "said"

Column 5 lines 15 and 16 delete "positioned in a valley of said corrugated tubing" between "body;" and ";and"

Signed and Sealed this

Eighteenth Day of July, 2000

Attest:

Q. TODD DICKINSON

*Attesting Officer*   *Director of Patents and Trademarks*